(12) United States Patent
Nafie et al.

(10) Patent No.: US 6,320,902 B1
(45) Date of Patent: *Nov. 20, 2001

(54) TIME DOMAIN EQUALIZER FOR ADSL

(75) Inventors: Mohammed Nafie, Minneapolis, MN (US); Song Wu, Plano, TX (US)

(73) Assignee: Texas Instruments Incorporated, Dallas, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/997,491

(22) Filed: Dec. 23, 1997

Related U.S. Application Data

(60) Provisional application No. 60/034,341, filed on Dec. 23, 1996.

(51) Int. Cl.⁷ ....................................................... H04B 3/46
(52) U.S. Cl. ............................................. 375/228; 375/229
(58) Field of Search ..................................... 375/228, 224, 375/229

(56) References Cited

U.S. PATENT DOCUMENTS 3,997,841 * 12/1976 Borowski ............................. 375/229
5,285,474 * 2/1994 Chow et al. ......................... 375/231

* cited by examiner

*Primary Examiner*—Chi Pham
*Assistant Examiner*—Kevin M Burd
(74) *Attorney, Agent, or Firm*—Warren L. Franz; Wade James Brady, III; Frederick J. Telecky, Jr.

(57) ABSTRACT

An equalization technique for an ADSL data communications system is disclosed. The effective channel overall response is made a window of length I equal to the length of the cyclic prefix. The response energy output of filtering is monitored against a preset threshold value to adaptively position the window.

4 Claims, 3 Drawing Sheets

TIME DOMAIN EQUALIZER FOR ADSL

This application claims priority under 35 U.S.C. § 119 (e)(1) of provisional U.S. Ser. No. 60/034,341 filed Dec. 23, 1996, entitled "Time Domain Equalizer for ADSL," the entirety of which is incorporated herein by reference.

This invention relates to digital subscriber loop telecommunications systems and, in particular, to channel equalizers for the same.

BACKGROUND OF THE INVENTION

The current asymmetrical digital subscriber line (ADSL) standard is based on discrete multi-tone signalling (DMIT) protocol, wherein each frame is comprised of the IFFT of a number of samples. In ADSL channels, and at such high data rates, it is computationally expensive to fully equalize the channel. Hence, only partial equalization is implemented to constrain the overall effective channel length to a certain number of samples, say v. Then the last v samples of each frame are used as a prefix to the frame, so that in effect the time domain data is chclically convolved with effective overall channel response, composed of the physical channel and the equalizer. FIG. 1 shows the overall situation.

The current equalization technique, which relies on frequency domain 1 ms (least mean square) is computationally expensive, is nonlinear, and its steady state error is light.

SUMMARY OF THE INVENTION

The invention provides an equalization technique that relies on time domain lms, has lower computational complexity and has lower steady state error.

BRIEF DESCRIPTION OF THE DRAWINGS

Embodiments of the invention have been chosen for purposes of illustration and description and are described with reference to the accompanying drawings, wherein.

DETAILED DESCRIPTION OF PREFERRED EMBODIMENTS

General and additional details concerning digital subscriber loop modem telecommunications are given in copending patent Ser. No. 08/677,267, filed Jun. 20, 1996, entitled "Multi-Mode Digital Modem,", now U.S. Pat. No. 6,055,268, the entirety of which is hereby incorporated by reference.

If the channel response is assumed to be given by h and the equalizer by w, then the overall response will be given by b=h*w. The objective is to make this effective channel overall response of length equal to the length of the cyclic prefix, I, sent as an overhead on each DMT frame. In other words, since achieving this exactly would probably be impractical computationally—or even theoretically impossible—with a finite length equalizer, what is wanted is to have a window with size I with most of the energy of b inside this window, or to decrease any energy outside that window. Now, from the training sequence a pretty good estimate of h can be obtained. This can then be convolved with the equalizer to get an estimate of b.

Therefore, if it can be known beforehand where the best place is to position the maximum energy window over the overall length of b, the lms algorithm can be applied with the input being h and the error signal being the components of b outside the window. One may choose to position the window to coincide with the position of the maximum energy window over h but this doesn't always work. Another method would be to run the lms algorithm several times for several window positions. This might require a large amount of computation. So, instead of that the value of b that is output from filtering h with w can be monitored, and when this value exceeds a certain preset threshold, the window applied. Thus, this window will change its position adaptively with the adapted w, and better performance should be expected.

The method can be summarized as follows:
1. Perform FFT on the received training data y to get Y.
2. To get an estimate H of the frequency response of the channel, divide Y by the training sequence X. Perform an IFFT to get an estimate of h. Averaging a large number of frames will give a good estimate of the true h.
3. Start with any initial estimate of w.
   a. Filter h using w.
   b. Update w using the lms algorithm, with the error equal to the output of the filter, and the input equal to h. The equation is thus, w=w+2*~*b(n)*h, where h is the vector composed of the components of h currently in the equalizer. While doing so, monitor the output of this filtering process.
   c. When the output exceeds a preset threshold, assume the lms error equal to zero for a number for outputs equal to 1.
   d. Continue filtering and updating for the whole length of h.
   e. Repeat the above steps until the lms converges.

Figure 1:
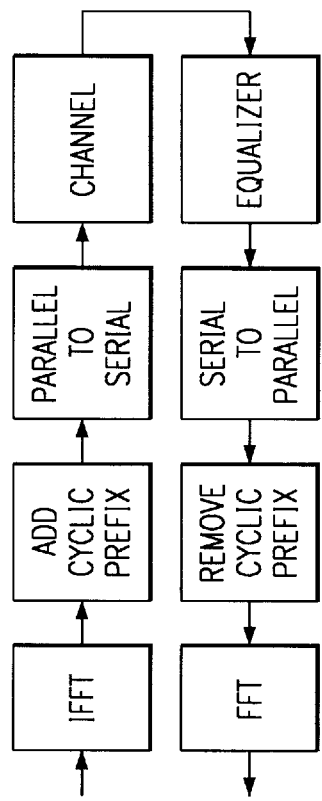
FIG. 1 is a block diagram showing the DMT signalling system.
Figure 2:
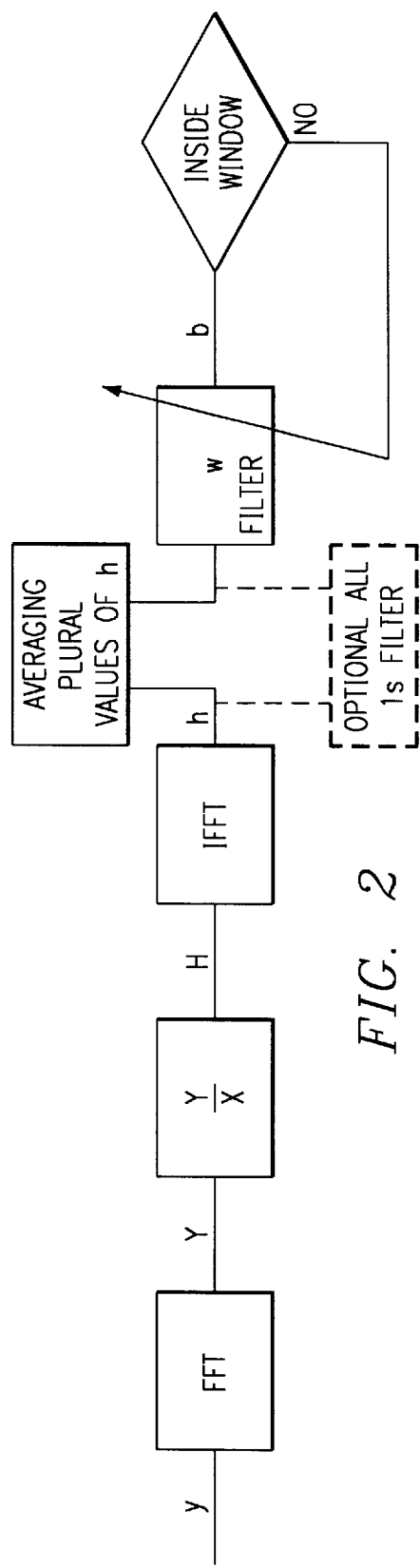
FIG. 2 is a block diagram showing a prepared equalizer implementation.

FIG. 2 illustrates an implementation of such a procedure.

Although this technique converges faster and offers performance which is better than frequency domain lms, it can be made to converge even faster. This is achieved by placing an all 1's filter before the w filter and then using time domain lms with the error equal to the output when not in the window, and the input is the output of the all 1's filter.

Figure 3:
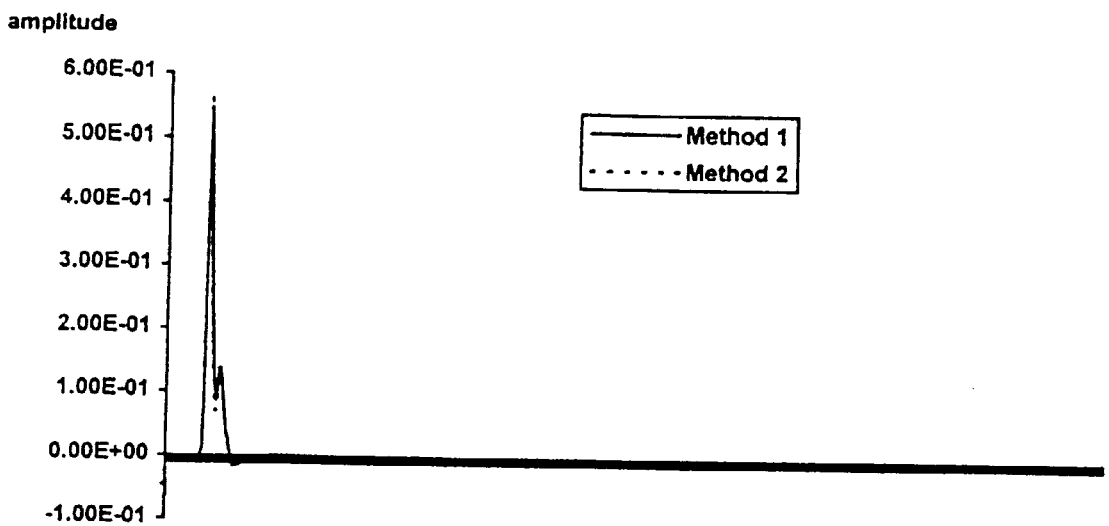
FIG. 3 shows the system response after application of the equalizer of FIG.2.

FIG. 3 shows the results of applying the previous two techniques to a channel.

Figure 4:
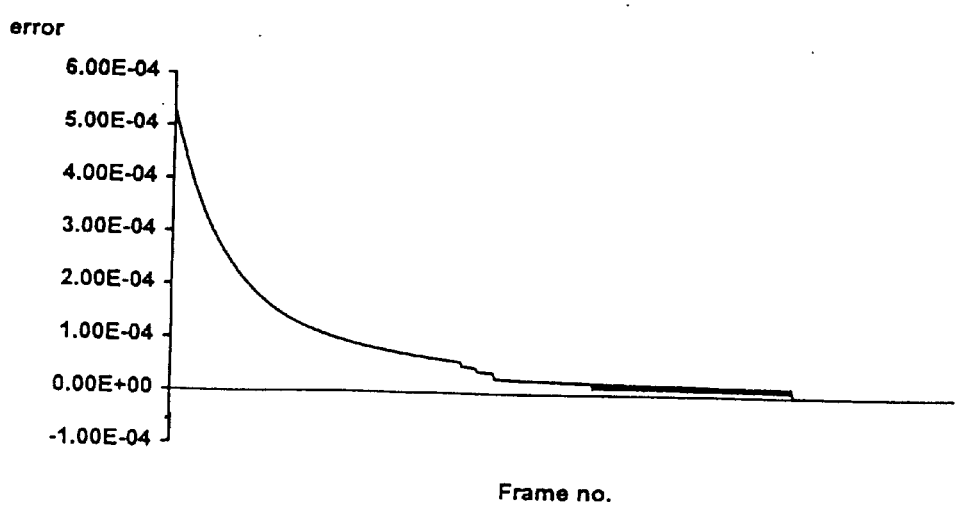
FIGS. 4 and 5 illustrate the convergence of both equalization methods.
Figure 5:
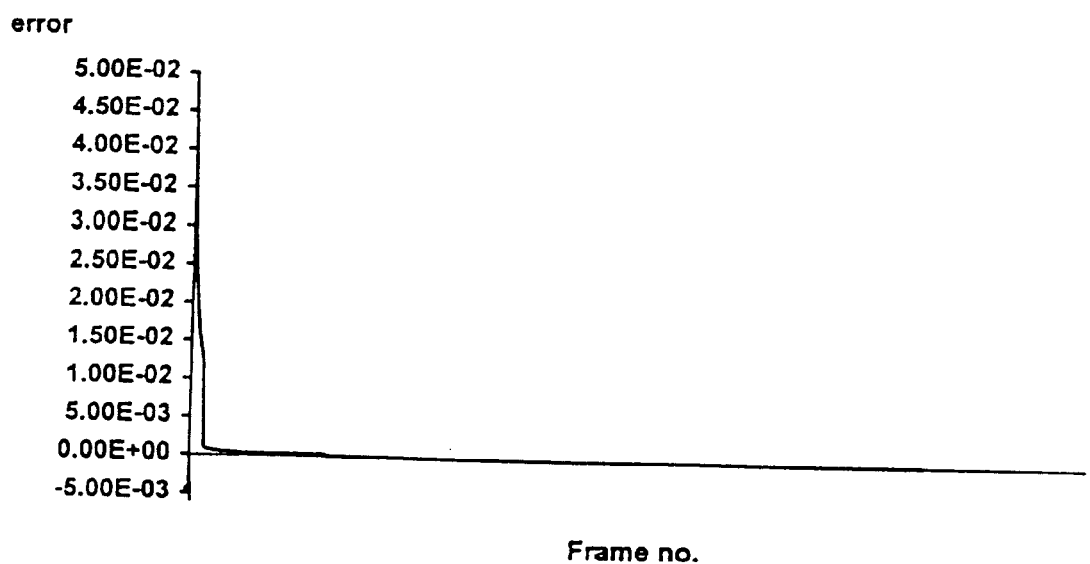

FIGS. 4 and 5 show the convergence of both methods.

Those skilled in the art to which the invention relates will appreciate that various substitutions and modifications may be made to the foregoing embodiments, without departing from the spirit and scope of the invention as defined in the claims.

What is claimed is:

1. A method for equalizing data transferred over a digital subscriber loop (DSL) modem data telecommunication channel having a frequency response utilizing a discrete multi-tone (DMT) signaling protocol wherein each frame is comprised of the inverse fast Fourier transform (IFFT) of a number of data samples; the response from the channel being given by h, the equalizer being given by w, and effective channel overall response being given by b=h*w; the method comprising the steps of:

providing a sequence of training data y;
  receiving said training data sequence y through the channel;
  performing a fast Fourier transform (FFT) on the received training data y to obtain fast Fourier transformed data Y of said training data y;

providing a training sequence X;

dividing fast Fourier transformed data Y by said training sequence X to obtain an estimate H of the frequency response of the channel;

then performing an IFFT on said estimate H of the frequency response of the channel a multiple number of times to obtain plural IFFT of plural said estimates h of the channel response;

averaging said plural estimates to provide an improved estimate of the channel response h;

defining an initial estimate of an equalizer w;

filtering the averaged h using w;

updating w using a least mean squared (lms) algorithm, with an error equal to the output of the filter and input equal to h;

continuing filtering and updating w for the whole length of said averaged h; and repeating the foregoing steps commencing with the step of defining w using each new value of w until the lms converges.

2. The method of claim 1 wherein said filter w is an all ones (1s) filter.

3. The method of claim 1 further including the steps of providing a window of size I wherein most of said output of said filter fits within said window and wherein said step of updating increases the amount of said output which fits within said window.

4. The method of claim 2 further including the steps of providing a window of size I wherein most of said output of said filter fits within said window and wherein said step of updating increases the amount of said output which fits within said window.

* * * * *